March 28, 1961 H. G. WEISS 2,977,390
PROCESS OF PREPARING AN ALKYLATED DIBORANE
Filed Sept. 21, 1956
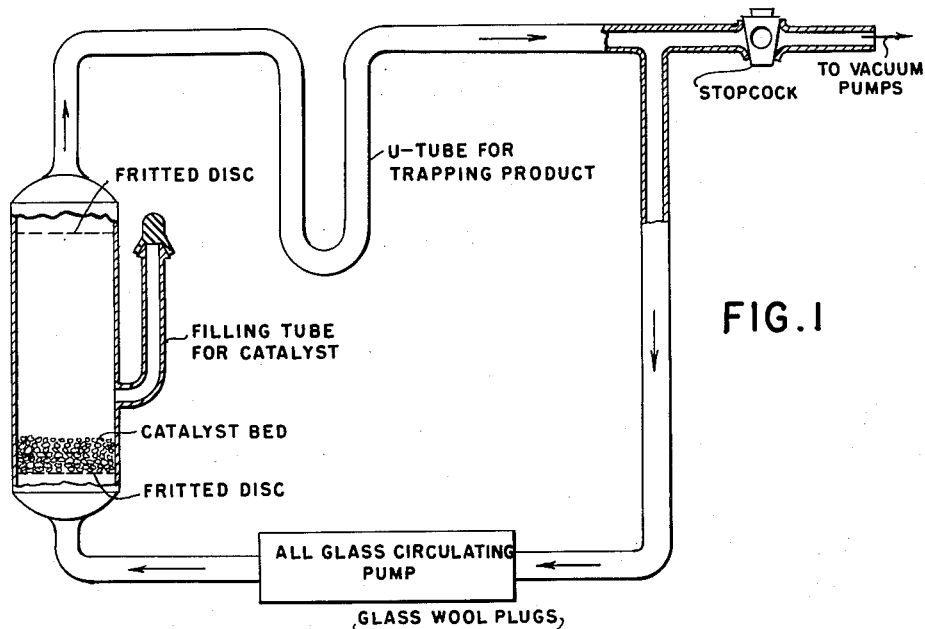
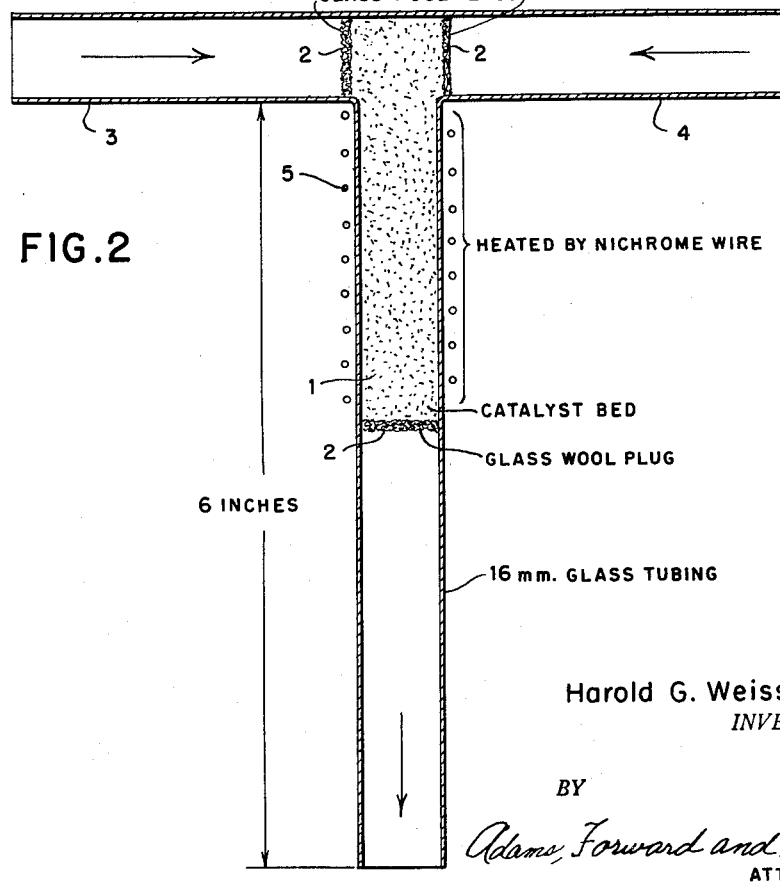
Harold G. Weiss
*INVENTOR.*
BY
*Adams, Forward and McLean*
ATTORNEYS United States Patent Office 2,977,390
Patented Mar. 28, 1961

2,977,390
PROCESS OF PREPARING AN ALKYLATED DIBORANE

Harold G. Weiss, Duarte, Calif., assignor, by mesne assignments, to Olin Mathieson Chemical Corporation, a corporation of Virginia Filed Sept. 21, 1956, Ser. No. 611,389

4 Claims. (Cl. 260—606.5)

My invention relates to a method for the manufacture of alkylated diboranes.

Depending upon the particular agent used to alkylate the diborane and the extent of the alkylation, the alkylated diboranes can be either normally liquid or normally gaseous. In either event, however, the alkylated diboranes produced when my process is carried out can be employed as fuels when burned with air or oxygen, for example, as described in Nerad Patent No. 2,582,268, issued January 15, 1952. Where the alkylated diboranes are normally liquid, they can be used as fuels for gas turbine engines, as described, for example, in Weilmuenster and Zaslowsky application Serial No. 533,944, filed September 13, 1955.

Thus, I have discovered that alkylated diboranes can be conveniently manufactured by passing diborane and a monoolefin hydrocarbon in gaseous admixture with each other into contact with a catalyst which is alumina having supported thereon one or more of the oxides of molybdenum, tungsten and chromium. The monoolefin hydrocarbon utilized will generally contain from 2 to 5 carbon atoms, for example, ethylene, propylene, 1-butene, 2-butene, isobutylene, 1-pentene or a mixture thereof. The reaction temperature employed will generally be within the range from $-20°$ C. to $+75°$ C., preferably from $15°$ C. to $60°$ C. The molar ratio of hydrocarbon to diborane in the gaseous mixture passed into contact with the catalyst can be varied considerably, depending upon the extent of alkylation desired. In general, however, the molar ratio of monoolefin hydrocarbon to diborane will be within the range from 0.5:1 to 5:1. Preferably, approximately 2 moles of monoolefin hydrocarbon to one mole of diborane are present in the reaction mixture. The catalyst composition will generally comprise from about 5 to 20 percent by weight of molybdenum oxide, tungsten oxide or chromium oxide, or mixture thereof, based upon the total weight of the catalyst.

The following examples illustrate various embodiments which fall within the scope of my invention:

EXAMPLE I

One gram of a commercial 10 weight percent $MoO_3$ on alumina catalyst containing 2.2 weight percent silica and having a surface area (BET method) of 275 square meters per gram was supported on a fritted glass disc in a circulating system (note Fig. 1) of approximately 2½ liter volume. The catalyst was of the following particle size (U.S. Standard sieve): on 100 mesh, 0.1 weight percent; on 200 mesh, 28 weight percent; and through 325 mesh, 21 weight percent. The catalyst was heated under vacuum at $450°$ C. for 20 hours. Consecutively, 416 cc. (STP) of ethylene and 404 cc. (STP) of diborane were condensed into the reaction system using liquid nitrogen as a refrigerant. The mixture was allowed to come to room temperature and was circulated through the catalyst for ½ hour. With liquid nitrogen cooling the trap the hydrogen formed (approx. 2 cm. of mercury pressure) was pumped out. The system was then permitted to warm to room temperature and circulation was continued for five hours. The pumping rate was about 50 to 300 cc./min. Dry Ice was used to cool the trap and remove the product from the circulating ethylene-diborane mixture.

After reaction the product was fractionated through $-63°$ C. and $-150°$ C. baths into liquid nitrogen. The $-63°$ C. and $-150°$ C. fractions were shown by mass spectral analysis to contain principally diethyldiborane plus some of the higher substituted ethyldiboranes. The total volume of diethyldiborane was 159.8 cc. (STP). Mass spectral analysis showed the $-196°$ C. fraction to contain 38.3 cc. (STP) of ethylene and 247.7 cc. (STP) of diborane. The total reactants consumed were 377.7 cc. (STP) of ethylene and 156.3 cc. (STP) of diborane. Total yield of product, within experimental error, was 100 percent based upon diborane consumed.

EXAMPLE II

One gram of the catalyst employed in Example I was supported on the fritted glass disc of the circulating system of Fig. 1. Hydrogen at 500 mm. of mercury pressure was circulated for 4 hours while heating the catalyst at $450°$ C. The catalyst was white before and brown after the treatment with hydrogen. The hydrogen was pumped out and 546 cc. (STP) of diborane was condensed into the reaction system using liquid nitrogen as a refrigerant for the trap. Then 546 cc. (STP) of ethylene was transferred into the system by condensation in the trap. The mixture was allowed to come to room temperature and was circulated through the catalyst for 40 minutes. The pumping rate was about 50–300 cc./min. After reaction 164 cc. (STP) of product was separated from unreacted ethylene and diborane by fractionation through a trap cooled to $-150°$ C. The unreacted diborane-ethylene mixture was returned to the reactor with 166 cc. (STP) of ethylene in addition. After circulating under the same conditions as before for 30 minutes, 33 cc. (STP) of product were isolated by fractionation. Circulation of the remaining ethylene-diborane mixture under the same conditions for 75 minutes yielded 130 cc. (STP) of product by fractionating.

No unreacted ethylene remained; however, 235 cc. (STP) of unreacted diborane was recovered. The total reactants consumed were 712 cc. (STP) of ethylene and 311 cc. (STP) of diborane. The total yield of product, within experimental error, was 100 percent based upon diborane consumed. Mass spectral and infrared analysis of the product showed it to be a mixture containing principally diethyldiborane with trace amounts of higher substituted diboranes.

EXAMPLE III

The catalyst consisted of commercial 9 weight percent molybdena (reduced by treatment with hydrogen at $450°$ C. for four hours) on ⅜ inch alumina pellets. The pellets were crushed to about ⅟₁₆ inch, then placed in a vertical reactor (Fig. 2) and heated at $130°$ C. in a vacuum oven for 15 hours. The reactor was a T made of 16 mm. glass tubing, with the catalyst bed 1 being held in place by glass wool plugs 2. Then diborane, at the rate of 20 ml. at S.T.P. per minute, was passed through the reactor at room temperature for about 45–60 minutes in order to pretreat the catalyst which was supported on glass wool in the reactor.

After the catalyst pretreatment had been completed the same reactor, with catalyst in place, was utilized in carrying out the reaction between diborane and ethylene in the presence of a diluent to form diethyldiborane. Diborane and nitrogen were passed into arm 3 and ethylene into arm 4. Because of the tendency of liquid products to condense out in the lower section of the reactor, it was found necessary to heat this section of the reactor to a temperature of 40–60° C. This was accomplished by an electric current passing through a few turns of Nichrome wire 5 which were wrapped around the lower section of the reactor. A thermometer was installed in the reactor in contact with the bed for temperature measurements. The flows of diborane, nitrogen and ethylene were measured through flowrators, and were begun simultaneously after the reactor had been heated to the desired temperature.

The catalyst bed containing 21 grams of catalyst was heated to 40° C. and the flows of gases were simultaneously begun, diborane at the rate of 10 ml. at S.T.P. per minute, nitrogen at the rate of 35 ml. at S.T.P. per minute, and ethylene at the rate of 20 ml. at S.T.P. per minute. The residence time was approximately 2.2 minutes. The reaction appeared to occur at the top of the catalyst bed at the point of initial mixing of the gases and without external heating. The reaction products were lead from the reactor to a trap cooled to −196° C. After 90 minutes the flows of gases were simultaneously stopped and the reaction terminated.

The products from the reaction which had been collected in the −196° C. trap were fractionated under vacuum through four traps maintained at −22° C., −64° C., −140° C. and −196° C. respectively. An infrared analysis of the small amount of material collected in the trap at −22° C. sowed that it was triethylborane.

The material in the −64° C. trap was re-fractionated through three traps maintained at −22° C., −64° C. and −196° C. respectively. The traps at −22° C. and −196° C. contained only a trace of products. The trap at −64° C. contained 1.376 g. of product having a vapor pressure of 45 mm. of Hg at 0° C. The vapor pressure of diethyldiborane has been reported as 43 mm. of Hg at 0° C. The calculated active hydrogen value for diethyldiborane is 0.0212 mole of active hydrogen per mole of material which compares favorably with 0.0210 mole of active hydrogen found by analysis of the liquid product obtained in the trap at −64° C.

The trap at −140° C. during the first fractionation contained 0.164 g. of product. An infrared analysis and vapor pressure determination showed that the material was monoethyldiborane.

The trap at −196° C. during the first fractionation contained 0.378 g. of product. An infrared analysis showed that this material was diborane.

A 59 percent conversion was obtained in this experiment based upon the recovery of 0.378 g. of unreacted diborane from an input of 0.916 g. of diborane. The yield was 84 percent diethyldiborane, 14.3 percent monoethyldiborane and about 1 percent triethylborane.

Other experiments conducted under similar conditions using the same bed of catalyst are summarized in Table I.

*Table 1*

| Example No. | Flow Rate of Diborane, cc./min. | Flow Rate of Ethylene, cc./min. | Flow Rate of Nitrogen, cc./min. | Temp. of Cat. Bed, °C. | Time | Percent Conv. | Percent $Et_2B_2H_4$ | Percent $EtB_2H_5$ | Percent $Et_3B$ |
|---|---|---|---|---|---|---|---|---|---|
| IV | 15 | 30 | 40 | 25 | 45 min | N.D. | [1] 55 | N.D. | N.D. |
| V | 15 | 30 | 40 | 55–65 | 45 min | N.D. | [1] 62 | N.D. | N.D. |
| VI | 10 | 20 | 35 | [4] 75 | 1½ hr | N.D. | N.D. | N.D. | [2] |
| VII | 10 | 20 | 35 | 40 | 1½ hr | 54 | 84 | 14.3 | [3] 0.75 |
| VIII | 10 | 20 | 35 | [4] 60 | 1 hr | 89.8 | 76.5 | 7.9 | [3] 13.8 |
| IX | 20 | 40 | 35 | [4] 60 | 45 min | 92.4 | 60.8 | 14.6 | [3] 24.6 |

N.D. means not determined.
[1] Uncorrected yield.
[2] Product was almost entirely triethyl borane but was not weighed.
[3] The amount of triethyl borane was determined by subtraction, not by weighing percent $Et_2B_2H_4$, $EtB_2H_5$ and $Et_3B$ based on $B_2H_6$ converted.
[4] Approx.

I claim:

1. A method for the manufacture of an alkylated diborane which comprises passing a gaseous mixture of diborane and at least one monoolefin hydrocarbon having from 2 to 5 carbon atoms into contact with alumina having supported thereon at least one material selected from the group consisting of molybdenum oxide, tungsten oxide and chromium oxide.

2. The method of claim 1 wherein said monoolefin hydrocarbon is ethylene.

3. The method of claim 1 wherein said material is molybdenum oxide.

4. The method for the preparation of an alkylated diborane which comprises passing a gaseous mixture of diborane and ethylene into contact with alumina having supported thereon molybdenum oxide, the reaction temperature being within the range from 15° C. to 60° C. and the molar ratio of ethylene to diborane being within the range from 0.5:1 to 5:1.

No references cited.